US009147260B2

(12) United States Patent
Hampapur et al.

(10) Patent No.: US 9,147,260 B2
(45) Date of Patent: Sep. 29, 2015

(54) DETECTION AND TRACKING OF MOVING OBJECTS

(75) Inventors: Arun Hampapur, Norwalk, CT (US); Jun Li, Marietta, GA (US); Sharathchandra Pankanti, Darien, CT (US); Charles A. Otto, Lansing, MI (US)

(73) Assignee: International Business Machines Corporation, Armonk, NY (US)

( * ) Notice: Subject to any disclaimer, the term of this patent is extended or adjusted under 35 U.S.C. 154(b) by 724 days.

(21) Appl. No.: 12/972,836

(22) Filed: Dec. 20, 2010

(65) Prior Publication Data

US 2012/0154579 A1    Jun. 21, 2012

(51) Int. Cl.
*G06T 7/20* (2006.01)
*G03B 15/16* (2006.01)

(52) U.S. Cl.
CPC ............... *G06T 7/2006* (2013.01); *G06T 7/204* (2013.01); *G06T 7/208* (2013.01); *G06T 7/2013* (2013.01); *G06T 7/2033* (2013.01); *G06T 7/2053* (2013.01); *G06T 7/2073* (2013.01); *G03B 15/16* (2013.01); *G06T 2207/10016* (2013.01); *G06T 2207/20076* (2013.01); *G06T 2207/30232* (2013.01); *G06T 2207/30241* (2013.01)

(58) Field of Classification Search
USPC .................................................. 348/154, 155
See application file for complete search history.

(56) References Cited

U.S. PATENT DOCUMENTS

| 6,757,008 | B1  |  6/2004 | Smith |  |
|---|---|---|---|---|
| 6,798,897 | B1* | 9/2004 | Rosenberg | ................... 382/107 |
| 7,015,945 | B1  | 3/2006 | Sullivan |  |
| 7,583,815 | B2  | 9/2009 | Zhang et al. |  |
| 7,783,118 | B2  | 8/2010 | Zhou |  |
| 2002/0094135 | A1* | 7/2002 | Caspi et al. | ................... 382/294 |
| 2005/0063608 | A1* | 3/2005 | Clarke et al. | ................... 382/284 |
| 2005/0073585 | A1* | 4/2005 | Ettinger et al. | ............... 348/155 |
| 2005/0213818 | A1* | 9/2005 | Suzuki et al. | ................. 382/190 |
| 2005/0238198 | A1* | 10/2005 | Brown et al. | ................. 382/103 |

(Continued)

FOREIGN PATENT DOCUMENTS

| DE | 102009036200 A1 | 5/2010 |
|---|---|---|
| FR | 2930211 A3 | 10/2009 |

(Continued)

OTHER PUBLICATIONS

A. Dore, A. Beoldo, & C.S. Regazzoni, "Multitarget Tracking with a Corner-based Particle Filter", 12th IEEE Int'l Conf. on Computer Vision Workshops 1251-1258 (Oct. 2009).*

(Continued)

*Primary Examiner* — Dave Czekaj
*Assistant Examiner* — David N Werner
(74) *Attorney, Agent, or Firm* — Ryan, Mason & Lewis, LLP

(57) ABSTRACT

A system and computer program product for performing visual surveillance of one or more moving objects include registering one or more images captured by one or more cameras, wherein registering the one or more images comprises region-based registration of the one or more images in two or more adjacent frames, performing motion segmentation of the one or more images to detect one or more moving objects and one or more background regions in the one or more images, and tracking the one or more moving objects to facilitate visual surveillance of the one or more moving objects.

18 Claims, 8 Drawing Sheets

(56) References Cited

U.S. PATENT DOCUMENTS

| | | | |
|---|---|---|---|
| 2005/0244081 A1* | 11/2005 | Zhou et al. | 382/299 |
| 2006/0017807 A1 | 1/2006 | Lee et al. | |
| 2007/0070190 A1 | 3/2007 | Yin et al. | |
| 2007/0104383 A1 | 5/2007 | Jojic et al. | |
| 2007/0116356 A1* | 5/2007 | Gong et al. | 382/173 |
| 2007/0253618 A1* | 11/2007 | Kim et al. | 382/154 |
| 2008/0037869 A1* | 2/2008 | Zhou | 382/173 |
| 2008/0060034 A1* | 3/2008 | Egnal et al. | 725/105 |
| 2008/0137940 A1* | 6/2008 | Kakinami et al. | 382/154 |
| 2008/0199044 A1* | 8/2008 | Tsurumi | 382/103 |
| 2008/0199050 A1* | 8/2008 | Koitabashi | 382/107 |
| 2009/0092336 A1* | 4/2009 | Tsurumi | 382/294 |
| 2009/0141043 A1* | 6/2009 | Guo et al. | 345/629 |
| 2009/0175538 A1* | 7/2009 | Bronstein et al. | 382/173 |
| 2009/0251544 A1* | 10/2009 | Martin et al. | 348/155 |
| 2009/0257655 A1* | 10/2009 | Melikian | 382/190 |
| 2010/0017128 A1* | 1/2010 | Zeng | 701/301 |
| 2010/0034446 A1* | 2/2010 | Zhu et al. | 382/130 |
| 2010/0079609 A1* | 4/2010 | Hwang et al. | 348/222.1 |
| 2010/0104199 A1* | 4/2010 | Zhang et al. | 382/199 |
| 2010/0231593 A1* | 9/2010 | Zhou et al. | 345/428 |
| 2010/0284572 A1* | 11/2010 | Lukas et al. | 382/107 |
| 2011/0128385 A1* | 6/2011 | Bedros et al. | 348/164 |
| 2011/0187829 A1* | 8/2011 | Nakajima | 348/46 |

FOREIGN PATENT DOCUMENTS

| | | | | |
|---|---|---|---|---|
| JP | H08185521 | | 7/1996 | |
| JP | 2001167249 | A | 6/2001 | |
| JP | 2002074369 | A | 3/2002 | |
| JP | 2004157908 | A | 6/2004 | |
| JP | 2009156611 | A | 7/2009 | |
| WO | WO 9638006 | A1 * | 11/1996 | H04N 7/30 |
| WO | 2004036894 | A2 | 4/2004 | |
| WO | 2004063991 | | 7/2004 | |

OTHER PUBLICATIONS

B. Yu & A.K. Jain, "Lane Boundary Detection Using a Multiresolution Hough Transform", 2 Int'l Proc. of 1997 Int'l Conf. on Image Processing 748-751 (Oct. 1997).*

J. Canny, "A Computational Approach to Edge Detection", 6 IEEE Trans. on Pattern Analysis & Machine Intelligence 697-698 (Nov. 1986).*

T. Fei, Liang Xaio-hui, He Zhi-ying, & Hua Guo-liang, "A Reigistration Method Based on Nature Feature with KLT Tracking Algorithm for Wearable Computers", 2008 Int'l Conf. on Cyberworlds 416-421 (2008).*

X. Zheng, Y. Zhao, N. Li, & H. Wu, "An Automatic Moving Object Detection Algorithm for Video Surveillance Applications", 2009 Int'l Conf. on Embedded Software & Sys. 541-543 (May 2009).*

I. Ahmad, W. Zheng, J. Luo, & M. Liou, "A Fast Adaptive Motion Estimation Algorithm", 16 IEEE Trans. on Circuits & Sys. for Video Tech. 420-438 (Mar. 2006).*

G. Jing, D. Rajan, & C.E. Siong, "Motion Detection With Adaptive Background and Dynamic Thresholds", 5 Int'l Conf. on Info., Comms. & Signal Processing 41-45 (Dec. 2005).*

J.S. Kim, M. Hwangbo, & T. Kanade, "Motion Estimation using Multiple Non-Overlapping Cameras for Small Unmanned Aerial Vehicles", presented at the 2008 IEEE Int'l Conf. on Robotics & Automation (May 2008).*

M. Nagai, T. Chen, R. Shibasaki, H. Kumagai, & A. Ahmed, "UAV-Borne 3-D Mapping System by Multisensor Integration", 47 IEEE Transactions & Geosci. & Remote Sensing 701-708 (Mar. 2009).*

English-language machine translation of Notifications of Reasons for Refusal; Japanese Patent Application No. 2013-543794 (Mar. 2015).*

Kang et al., A Layer Extraction System Based on Dominant Motion Estimation and Global Registration, 2004 IEEE International Conference on Multimedia and Expo: Jun. 27-30, 2004. Taipei, Taiwan, IEEE Operations Center, Piscataway, NJ, vol. 1, Jun. 27, 2004, pp. 551-554.

Tabatabai et al., Motion Estimation Methods for Video Compression—A Review, Journal of the Franklin Institute, Pergamon Press, Elmsfor, NY, US, vol. 335, No. 8, Nov. 1, 1998, pp. 1411-1441.

Firoozfam et al., "A Multi-Camera Conical Imaging System for Robust 3D Motion Estimation, Positioning and Mapping from UAVs." 2003.

Terakubo et al. Motion Detection from Image Sequences with a Moving Camera by a Two-Step Affine Transformation Algorithm, vol. 95, No. 446, pp. 31-36, Dec. 22, 1995. (English abstract included).

Hashimoto, Video Security Technology for Safe and Secure Society, System/Control/Information, The Institute of Systems, Control and Information Engineers, vol. 50, No. 10, pp. 18-23, Oct. 15, 2006. (Reference describes performing a tracking using a KLT method, see section 3.1 "Measurement of Human Movement Line").

Kano, The 11th, Prediction of a Next-Generation Digital Camera/Digital Movie, The Journal of the Institute of Image Information and Television Engineers, The Institute of Image Information and Television Engineers, vol. 62, No. 11, pp. 1724-1729, Nov. 1, 2008. (Reference describes generating a panoramic image using a common plane, see sections 2.3 "plane panorama" and 2.4 "other panoramic images").

* cited by examiner

SUB-REGION SELECTION 1

SUB-REGION SELECTION 2

DETECTION AND TRACKING OF MOVING OBJECTS

FIELD OF THE INVENTION

Embodiments of the invention generally relate to information technology, and, more particularly, to object detection.

BACKGROUND OF THE INVENTION

In recent years, reconnaissance, surveillance, disaster relief, search and rescue, agriculture information gathering and fast remote sensing mapping has gained increasingly attentions in civilian and military purposes. For example, due to their small size and low-cost sensor platform, Unmanned Aerial Vehicle (UAV) can be an attractive platform for executing such operations. However, UAV introduces some significant challenges when used in surveillance systems. For an instance, the background significantly changes as the camera has a fast motion and an irregular rotation, and the motion of a UAV vehicle is usually not smooth. Further, frame rate is very low (for example, 1 frame per second) so as to increase the difficulties of detecting and tracking ground moving targets, and small object size will bring another challenge for object detection and tracking. Also, a camera's strong illumination change and stripe noise can create some hard problems to separate true moving objects from the background.

Existing approaches also include object initialization issues, and are additionally unable to obtain high-accuracy registration results, to handle rotation and scale variation of a target, and to deal with similar distribution between target and background.

SUMMARY OF THE INVENTION

Principles and embodiments of the invention provide techniques for detection and tracking of moving objects. An exemplary method (which may be computer-implemented) for performing visual surveillance of one or more moving objects, according to one aspect of the invention, can include steps of registering one or more images captured by one or more cameras, wherein registering the one or more images comprises region-based registration of the one or more images in two or more adjacent frames, performing motion segmentation of the one or more images to detect one or more moving objects and one or more background regions in the one or more images, and tracking the one or more moving objects to facilitate visual surveillance of the one or more moving objects.

One or more embodiments of the invention or elements thereof can be implemented in the form of a computer product including a tangible computer readable storage medium with computer useable program code for performing the method steps indicated. Furthermore, one or more embodiments of the invention or elements thereof can be implemented in the form of an apparatus including a memory and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s), or (iii) a combination of hardware and software modules; any of (i)-(iii) implement the specific techniques set forth herein, and the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION OF EMBODIMENTS

Figure 1:
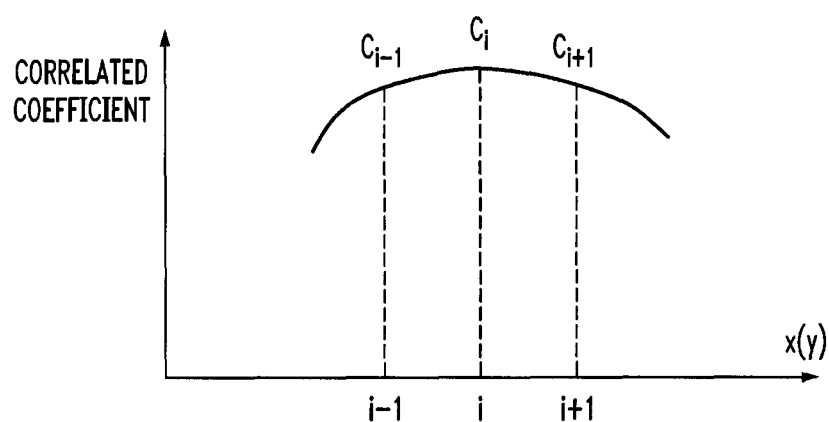
FIG. 1 is a diagram illustrating sub-pixel position estimation, according to an embodiment of the present invention.

Principles of the invention include detection, tracking, and searching of moving objects in visual surveillance. In an example setting including moving objects and one or more moving cameras, one or more embodiments of the invention include motion segmentation (motion blobs versus background region), multiple object tracking (for example, consistently tracking in over-time) and reference plane-based registration and tracking. As detailed herein, one or more embodiments of the invention include using multiple cameras (for example, registered with each other) mounted, for example, on mobile platforms (for example, unmanned aerial vehicle (UAV) videos) to detect, track and search for moving objects by forming a panoramic view from the images received from the cameras based on global/local geometric registration, motion segmentation, moving object tracking, reference plane-based registration and tracking and automatic urban road extraction.

The techniques described herein include recursive geometric registration, which includes region-based image registration for adjacent frames instead of for an entire frame, sub-pixel image matching techniques, and region-based geometric transformation for handling lens geometric distortion. Also, one or more embodiments of the invention include two-way motion detection and hybrid target tracking using colors and features. Two-way motion detection includes forward and backward frame differencing, automatic dynamic threshold estimation based on temporary and/or spatial filtering, as well as false moving pixel removal based on independent motions of features. Hybrid target tracking includes Kanade-Lucas-Tomasi feature tracker (KLT) and meanshift, auto kernel scale estimation and updating, and consistently tracking in over-time using coherent motion of feature trajectories.

Further, the techniques detailed herein include multi-target tracking algorithms based on feature matching and distance matrices for small targets, as well as, for example, a UAV surveillance system implementation with Low frame rate (1 f/s) for detecting and tracking the targets with small size (for example, without any known shape model).

As noted herein, one or more embodiments of the invention include local/global geometric registration of videos (for example, UAV videos). In order to reduce the camera motion effect, a frame-to-frame video registration process is implemented. An accurate way to register two images can include matching every pixel in each image. However, the high computation is not feasible. An efficient way is to find a relatively small set of feature points in the image that will be easy to find again and use only those points to estimate a frame-to-frame homography. By way of example only, 500-600 feature points can be extracted for an image of 1280×1280 pixels.

Harris corner detector can be applied to image registration and motion detection due to its invariance to scale, rotation and illumination variation. In one or more embodiments of the invention, Harris corner detector can be used as a feature point detector. Its algorithm can be described as follows:

1. For a pixel in an image I, compute its x- and y-directional derivatives I x and I y, and I xy=I x I y.
2. Apply a window function A, that is, hx=AI x, hy=AI y, hxy=AI xy.
3. Compute $H = h_x h_y - h_{xy}^2 - \kappa (h_x + h_y)^2$ ($\kappa$ is a constant) to measure variations in both directions.
4. Threshold H and find local maxima to obtain a corner.

To compare the windows, one or more embodiments of the invention include using a normalized correlation coefficient, which is an efficient statistical method. The actual feature matching is achieved by maximizing the correlation coefficient over small windows surrounding the points. The correlation coefficient is given by:

$$\rho = \frac{\sum_{r=1}^{R}\sum_{c=1}^{C}[g_1(r,c)-u_1]\cdot[g_2(r,c)-u_2]}{\sqrt{\sum_{r=1}^{R}\sum_{c=1}^{C}[g_1(r,c)-u_1]^2 \sum_{r=1}^{R}\sum_{c=1}^{C}[g_2(r,c)-u_2]^2}}; \quad (1)$$

$$-1 \le \rho \le 1$$

where:
$g_1(r,c)$ represents individual gray values of template matrix;
$u_1$ represents average gray value of template matrix;
$g_2(r,c)$ represents individual gray values of corresponding part of search matrix;
$u_2$ represents average gray value of corresponding part of search matrix; and
R, C represents number of rows and columns of template matrix.

Therefore, the block matching process can be achieved as follows. For each point in a reference frame, all points in the chosen frame are examined and its most similar point is chosen. Next, it is tested whether the achieved correlation is reasonably high. The point with maxima correlation coefficient is taken as a candidate point.

Video registration requires real-time implementation. In one or more embodiments of the invention, the block-matching algorithm is only implemented for the features. As such, the computational expense can be significantly reduced.

One or more embodiments of the invention also include corresponding features checking and outlier removal. Feature-based block matching can sometimes cause a mismatch. To avoid a mismatching problem, one or more embodiments of the invention include using forward searching to process the mismatching data which cases are one too many, keeping the candidate corresponding feature with the maximum gradient value and removing the others. Also, backward searching is employed to solve the remaining mismatching problem using the same approach.

In many instances, a pair of features with similar attributes is accepted as a match. Nevertheless, some false matches may occur. Therefore, in one or more embodiments of the invention, a random sample consensus (RANSAC) outlier removal procedure is performed to remove incorrect matches and improve the registration precision.

The techniques detailed herein can additionally include coarse-to-fine feature matching. Multi-resolution feature matching can reduce searching space and false matching. At a coarsest resolution layer, feature matching is performed and the searching scope is determined. At the current resolution layer, the matching results at the last layer can be taken as initial results and the matching process can be performed by using equation (1) noted above. In one or more embodiments of the invention, a search scope is limited to 1-3 pixel(s). Further, the same operation can be repeated until the highest resolution layer is reached.

As additionally described herein, one or more embodiments of the invention include accurate position determination. For video registration and motion detection purposes, pixel level accuracy may not enough. In such instances, a sub-pixel position approach is considered, and a distance-based weighting interpolation is determined to the peak. The horizontal and vertical locations of the peak can be separately estimated for the feature. Also, the one-dimensional horizontal and vertical correlation curves can be obtained. Further, the correlation value in x,y directions is interpolated separately, and the accurate location of the peak is computed. By way of example, FIG. 1 is a diagram illustrating sub-pixel position estimation, according to an embodiment of the present invention.

Figure 2:
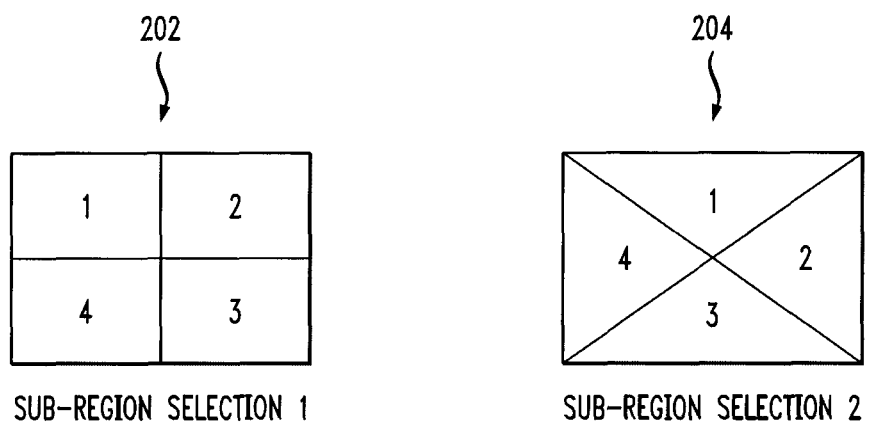
FIG. 2 is a diagram illustrating sub-region selection, according to an embodiment of the present invention.

The techniques described herein also include local geometric registration. By way of example, a sub-region geometric registration can be selected, and the entire frame can be divided into 2×2 sub-regions. FIG. 2 illustrates two selection models.

FIG. 2 is a diagram illustrating sub-region selection, according to an embodiment of the present invention. By way of illustration, FIG. 2 depicts sub-region selection model 202 and sub-region selection model 204.

One or more embodiments of the invention also include an affine-based local transformation, such as, for example, the following:

$$\begin{bmatrix} x \\ y \end{bmatrix} = \begin{bmatrix} a_0 + a_1 u + a_2 v \\ b_0 + b_1 u + b_2 v \end{bmatrix}$$

Where (x, y) is the new transformed coordinate of (u, v), and $(a_j, b_k)$ (j, k=1, 2, 3) is the set of transformation parameters. Further, to determine the local transformation parameters for each sub-region, one or more embodiments of the invention include using a least squares technique to compute the transformation parameters.

Figure 3:
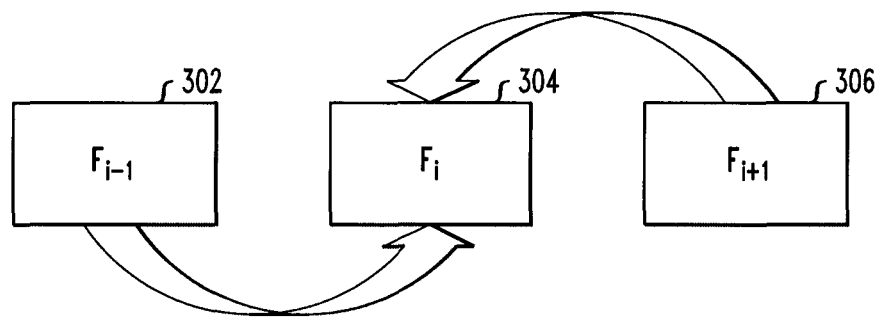
FIG. 3 is a diagram illustrating forward and backward geometric registration, according to an embodiment of the present invention.

One or more embodiments of the invention also include forward/backward frame-to-frame registration. For example, with instances of rapid camera motion, strong illumination variation and heavy stripe noise, to avoid residual error propagation, forward/backward frame-to-frame registration is carried out for multi-frame differencing. FIG. 3 illustrates an approach.

FIG. 3 is a diagram illustrating forward and backward geometric registration, according to an embodiment of the present invention. By way of illustration, FIG. 3 depicts frame 302 ($F_{i-1}$), frame 304 ($F_i$) and frame 306 ($F_{i+1}$). To estimate object motion at frame 304 ($F_i$), which is taken as a reference frame, previous frame 302 ($F_{i-1}$) and next frame 306 ($F_{i+1}$) are geometrically registered to the reference frame. Motion estimation for each frame is carried out in such a fashion.

Figure 4:
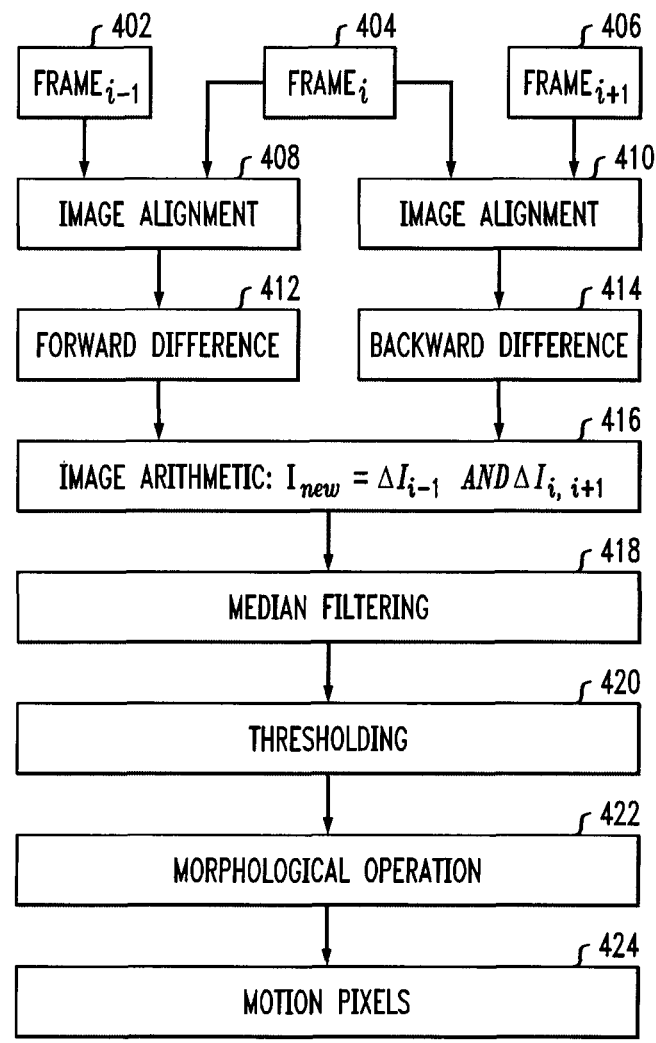
FIG. 4 is a flow diagram illustrating forward and backward frame differencing, according to an embodiment of the present invention.

Forward/backward frame differencing can also be implemented for motion detection. A diagram of the approach used in one or more embodiments of the invention is illustrated in FIG. 4. FIG. 4 is a flow diagram illustrating forward and backward frame differencing, according to an embodiment of the present invention. After forward/backward frame-to-frame images (for example, frame 402, frame 404 and frame 406) are geometrically registered and aligned in steps 408 and 410, difference images are calculated. Instead of using simple subtraction between the aligned frames, one or more embodiments of the invention use forward/backward frame differencing in steps 412 and 414 to reduce motion noise and compensate the illustration variation such as automatic gain control.

Additionally, step 416 includes performing image arithmetic via $I_{new}=\Delta_{i-1,i}$ AND $\Delta_{i,i+1}$. Step 418 includes median filtering, which can reduce random motion noise. To extract moving pixels of object moving objects, automatic dynamic threshold estimation based on spatial filtering in step 420 is carried out. Further, step 422 includes performing a morphological operation to remove small isolated spots and fill holes in foreground image and step 424 includes generating motion pixels (for example, a motion map).

To further reduce random noise and illumination variation effect, logical AND operation is implemented for forward/backward difference images to get a final difference image.

$$\begin{cases} D_{i-1,i}(x,y) = |F_{i-1}(x,y) - F_i(x,y)|; \\ D_{i,i+1}(x,y) = |F_i(x,y) - F_{i+1}(x,y)|; \end{cases}$$

$$D_i(x,y) = D_{i-1,i}(x,y) \cap D_{i,i+1}(x,y);$$

$$i = 1, 2, \ldots, N$$

A threshold for each pixel is statistically calculated automatically in terms of statistical characteristics and spatial high frequency data of difference image. Further, a morphology step can be applied to remove small isolated spots and fill holes in the foreground image.

Figure 5:
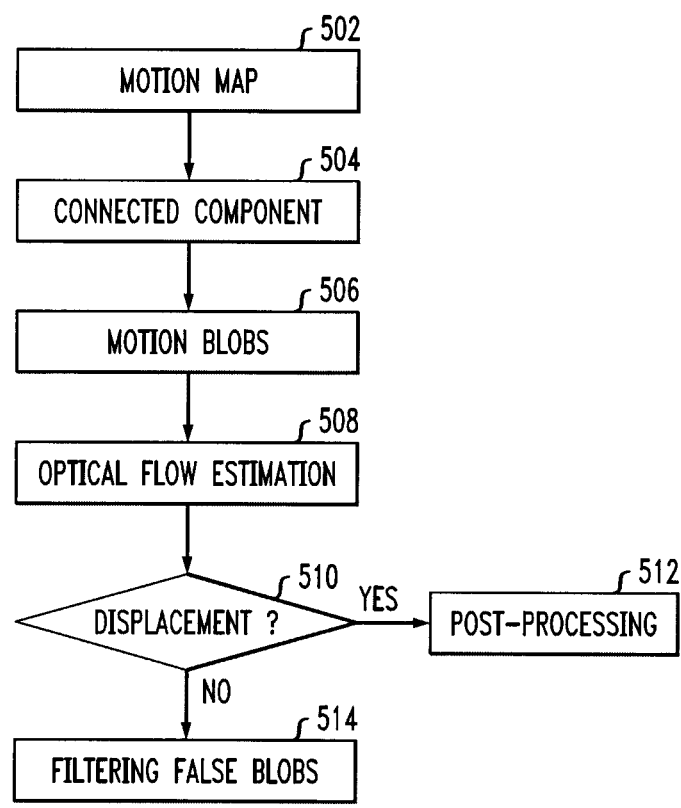
FIG. 5 is a flow diagram illustrating false blob filtering, according to an embodiment of the present invention.

As described herein, one or more embodiments of the invention also include motion verification. FIG. 5 is a flow diagram illustrating false blob filtering, according to an embodiment of the present invention. Step 502 includes generating a motion map. Step 504 includes applying a connected component process to link each blob data. Step 506 includes creating a motion blob table. Step 508 includes performing an optical flow estimation. Step 510 includes making a displacement determination. If there is displacement, the process proceeds to step 512, which includes performing post-processing such as, for example, data association, object tracking, trajectory maintenance and track data management. If there is no displacement, the process proceeds to step 514, which includes filtering false blobs.

Accordingly, after a blob table is created, in order to remove false motion blobs from the blob table, each blob data is verified. One or more embodiments of the invention apply a KLT process to estimate the motion of each blob after forward/backward frame-to-frame registration is done. A false blob will be deleted from the blob table. The process steps can include, for example, applying a connected component process to link each blob data, creating a blob table, extracting features for each blob in a previous registered frame, applying the KLT method to estimate the motion of each blob, and if no motion occurs, the blob is deleted from the blob table. Also, the above-noted steps can be repeated for all blobs.

Figure 6:
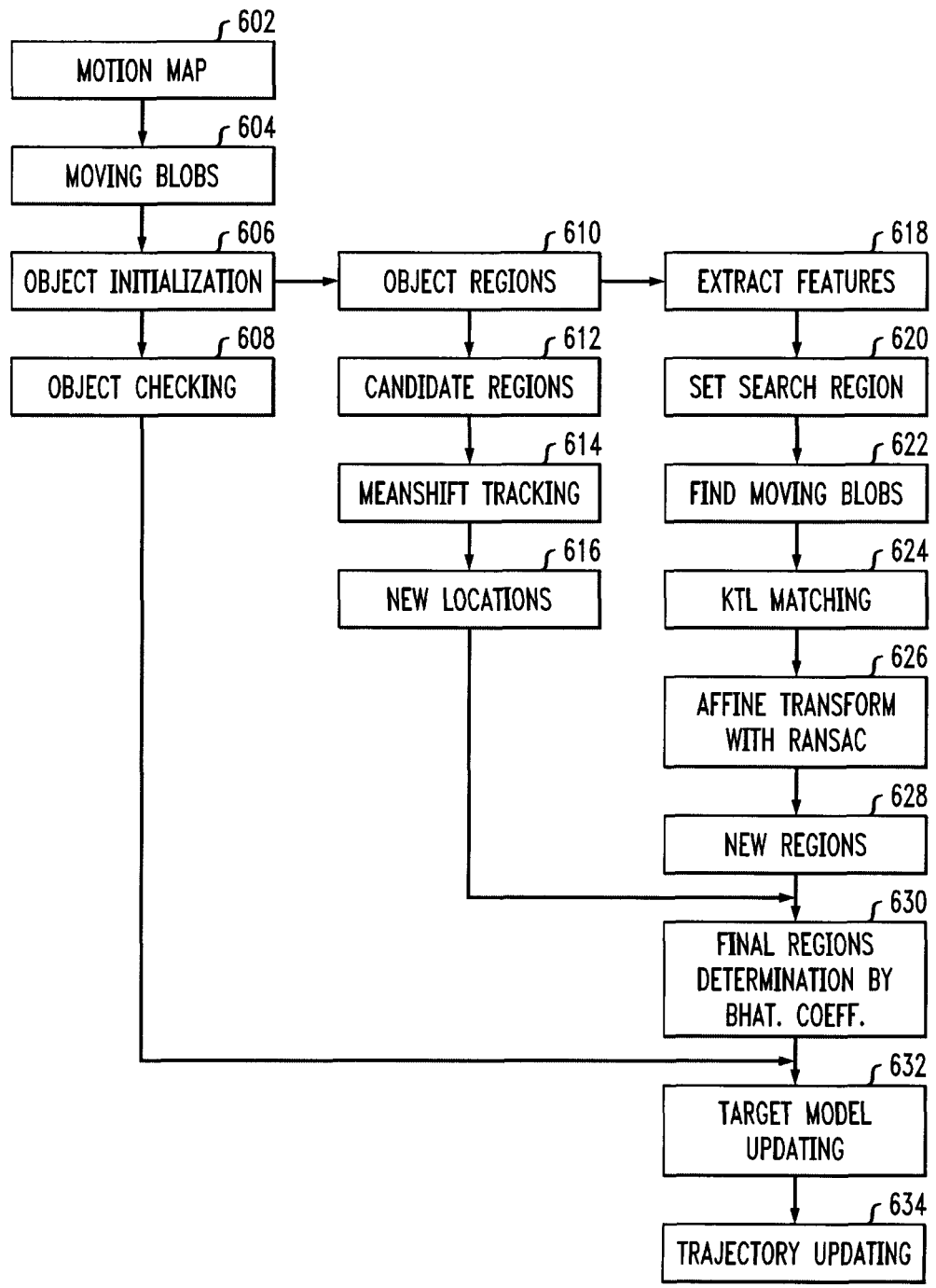
FIG. 6 is a flow diagram illustrating multi-object tracking, according to an embodiment of the present invention.

As also detailed herein, one or more embodiments of the invention include multi-object tracking. FIG. 6 is a flow diagram illustrating multi-object tracking, according to an embodiment of the present invention. Step 602 includes generating a motion map. Step 604 includes identifying moving blobs. Step 606 includes object initialization and step 608 includes object checking. Step 610 includes identifying object regions. Step 612 includes identifying candidate regions. Also, step 614 includes meanshift tracking and step 616 includes identifying new locations.

Additionally, after identifying object regions in step 610, features can be extracted in step 618. Once a search region is set in step 620, moving blobs can be found as potential object candidates in step 622. KLT matching is performed in step 624 and outlier removal based on an affine transform with RANSAC is performed in step 626. A new region candidate is identified in step 628. Meanwhile, Meanshift is applied in step 614 to compute the inter-frame translation. This yields a candidate region location in step 616. From steps 628 and 616, the process can proceed to step 630, which determines the final region location based on the Bhattacharyya coefficient. Also, step 632 includes target model updating for solving drift issues, and step 634 includes trajectory updating. Also, to track moving objects, a hybrid tracking model based on the combination of KLT and Meanshift method is applied from step 618 to 630.

As noted, the techniques described herein include object initialization. The motion detection results from forward/backward frame differencing can contain some correct real moving objects and some false objects, and miss some true objects. By way of example, for an UAV video with low frame rate (for example, 1 frame/second), a moving object does not have any overlapping regions between two consecutive frames so that traditional methods for object initialization will not work. To efficiently isolate promising moving objects among all detection results for current frame, one or more embodiments of the invention include combining a distance matrix with a similarity measure to initialize moving objects. The processing steps can include, for example, the following.

A search radius is set, matching score threshold and minimum length of tracked history. The distance matrix between the objects (including object candidates) and all the blobs in the table is computed. If the length of object trajectory is less than the preset value, a Kernel-based algorithm is applied to find the match between the object candidate and blobs in terms of a preset matching score. Also, if the object candidate appears in several consecutive frames, this candidate will be initialized and stored on the object table. Otherwise, the object candidate will be considered as a false object.

From the previous frame, one or more embodiments of the invention include projecting the previous blob set into a current frame after geometrical registration. The motion of each object according to its previous position can be estimated by a KLT tracking process. In a KLT tracking process, a motion model is approximately represented by an affine transformation, such that, $I_{curr}(A \bullet x+T)=I_{prev}(x)$ where A is a two-dimensional (2D) transformation matrix and T is the translation vector.

In one or more embodiments of the invention, affine transformation parameters can be computed from as few as four feature points. To determine these parameters, a least squares technique can be used to compute them.

Accuracy estimation can be performed, for example, when the number of mismatched pairs occurs. One measure of tracking accuracy is the root mean square error (RMSE) between the matched points before and after the affine transformation formula. This measure is used as a criterion to eliminate the matches that are considered imprecise.

Additionally, to eliminate the outliers, one or more embodiments of the invention includes performing the RANSAC algorithm to sequentially remove mis-matches in an iterative fashion until the RMSE value is lower than the desired threshold.

The techniques detailed herein additionally include meanshift tracking and object representation. By way of example, for a UAV tracking system, traditional intensity-based target representation is no longer suitable for multi-object tracking due to large scale variation and perspective geometric distortion. To efficiently characterize the object, histogram-based feature space can be chosen. In one or more embodiments of the invention, a metric based on the Bhattacharyya coefficient is used to define a similarity measure between a reference object and a candidate for multi-object tracking. Given an object region histogram q in the reference frame, the Bhattacharyya coefficient based objective function is given by:

$$\rho(p, q) = \sum_{u=1}^{M} p_u(x) q_u(x_0)$$

where M is the histogram dimension, and $x_0$ is the 2D center.

The candidate region histogram $p_u(x)$ at 2D center x in the current frame is to defined as:

$$p_u(x) = \frac{\sum k\left(\left\|\frac{x-x_i}{h}\right\|^2\right) \delta(b(x_i), u)}{\sum k\left(\left\|\frac{x-x_i}{h}\right\|^2\right)}$$

Here, u=1, 2, . . . , M. k(x) denotes a non-negative, non-increasing and piecewise-differentiable kernel profile which weights the pixel location, h is 2D bandwidth vector of k(x), δ is the Kronecker delta function and each pixel value is denoted by $b(x_i)$.

Additionally, in one or more embodiments of the invention, in determining a similarity measure between distributions, the Bhattacharyya distance can include $B(I_x, I_y) = \sqrt{1-\rho(p_x, p_y)}$, where $\rho(p_x, p_y) = \int \sqrt{p_x(u)p_y(u)} \, du$, and where $p_x$ and $p_y$ represent the target and the candidate distributions, respectively.

The techniques described herein can additionally include object positioning. To search the location corresponding to the object from one frame to the next, one or more embodiments of the invention include applying a meanshift tracking algorithm that is based on a gradient ascent optimization rather than an exhaustive search. Strengths of the meanshift method include computational effectiveness and suitability to real-time application. However, a target can be lost, for example, due to an intrinsic limitation of exploring local maxima, especially when the tracked object moves quickly. The candidate region histogram $p_u(x)$ can be obtained from the above equation.

The new location of the tracked object can be estimated as:

$$\hat{y}_1 = \frac{\sum_{i=1}^{n} X_i \omega_i g\left(\left\|\frac{\hat{y}_0 - X_i}{h}\right\|^2\right)}{\sum_{i=1}^{n} \omega_i g\left(\left\|\frac{\hat{y}_0 X_i}{h}\right\|^2\right)}$$

$$\text{where: } \omega_1 = \sum_{u=1}^{m} \delta[b(X_i) - u] \sqrt{\frac{\hat{q}_u}{\hat{p}_u(\hat{y}_0)}}$$

g(x)=−k(x), that the derivative of k(x).

One or more embodiments of the invention can also include target model updating on a temporal domain. In some circumstances, a meanshift approach without target model updating can suffer from abrupt changes in target model. On the other hand, the model updating for every frame can result in decreasing the reliability of the tracking results due to cluttered environment, occlusion, random noise, etc. One way to change the target model is to periodically update the target distributions.

To obtain a precise tracking result, the target model can be updated dynamically. Accordingly, one or more embodiments of the invention include model updating that use both recent tracking results and older target model to impact a current target model for object tracking. The updating procedure is formulized as:

$$q_u^{new} = (1-\alpha) q_u^{old} + \alpha \bullet p_u^s$$

Here, the superscripts of new and old denote the newly obtained target model and the old model, respectively. s represents the recent tracking result. α weights the contribution of the recent tracking result (normally <0.1). q and p represent the target model and the candidate model, respectively.

Further, one or more embodiments of the invention include target model updating on a spatial domain. Normally, meanshift based tracking hardly provides precise boundary position of the tracked object due to lack of utilizing spatial data. Fortunately, detection results derived from KLT tracker and motion detection results can provide much more accurate information, such as the precise position and object size compared with meanshift tracker.

Each individual algorithm may unable to do a perfect job on multi-object tracking. Thus, fusion among their data can be used in a multi-object tracking procedure. According to the strengths of each method, one or more embodiments of the invention use the following merging method:

$$\text{Output} = \begin{cases} \text{result by motion detector,} & \text{if Overlapping} \geq T \\ \text{KLT result;} & \text{if Outlier for MS occurs} \\ \text{result by meanshift;} & \text{otherwise} \end{cases}$$

where overlapping represents the degree of overlapping region.

Figure 7:
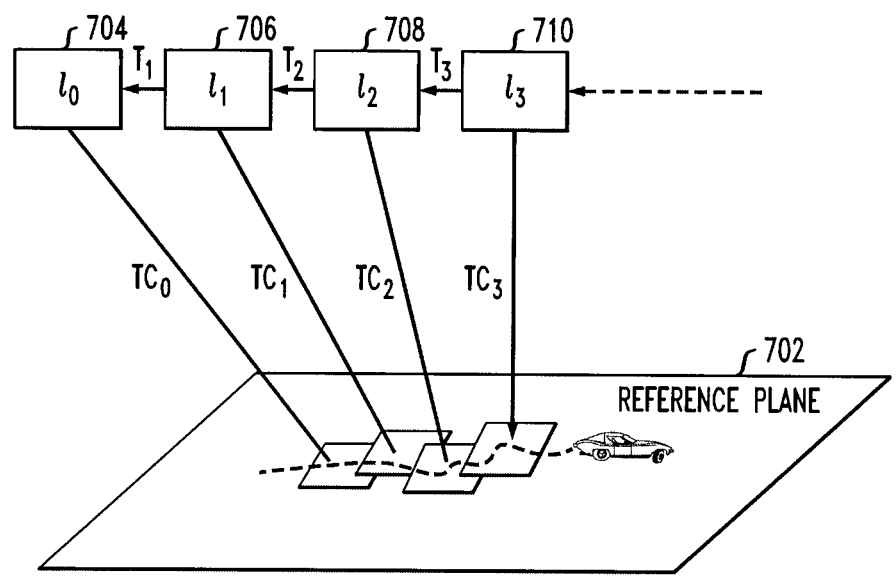
FIG. 7 is a diagram illustrating reference plane-based registration and tracking, according to an embodiment of the present invention.

FIG. 7 is a diagram illustrating reference plane-based registration and tracking, according to an embodiment of the present invention. By way of illustration, FIG. 7 depicts a geo-reference plane 702. The first frame 704 is registered to geo-reference plane 702, and the second frame 706 is registered to the geo-reference 702 from the first registered frame and corresponding inter-frame transformation parameters $TC_i$ (equation 712 in FIG. 7). In such fashion, frames 708 and 710 are registered to the geo-reference 702, respectively. Moreover, each object is projected into geo-reference 702 using navigation data.

Figure 8:
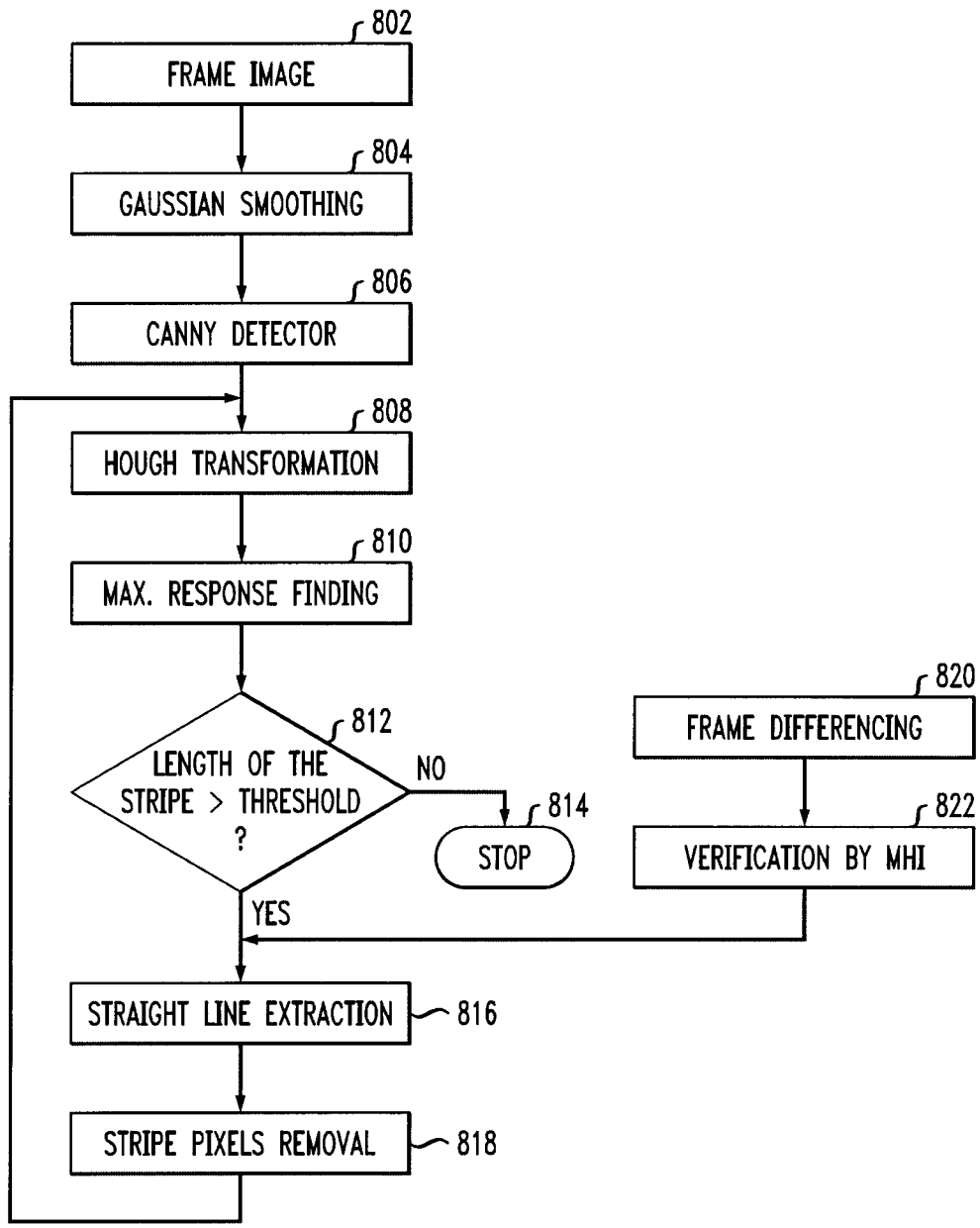
FIG. 8 is a flow diagram illustrating automatic urban road extraction, according to an embodiment of the present invention.

FIG. 8 is a flow diagram illustrating automatic urban road extraction, according to an embodiment of the present invention. Step 802 includes framing an image. Step 804 includes performing a Gaussian smoothing operation. Also, step 806 includes using a canny detector and step 808 includes implementing a hough transformation. Step 810 includes determining a maximum response finding. Step 812 includes determining if the length of the stripe is greater than a pre-defined threshold. If the length of the stripe is not greater than the threshold, the process stops at step 814. If the length of the stripe is greater than the threshold, the process continues to step 816, which includes performing a straight line extraction. Further, step 818 includes performing stripe pixels removal (which can, for example, lead to a return to step 808).

As also depicted in FIG. 8, step 820 includes performing frame differencing, and step 822 includes verification via motion history images (MHI) (which can, for example, lead to a return to step 816). Additionally, one or more embodiments of the invention can also include extraction of road stripes via iterative hough transform.

As detailed herein, one or more embodiments of the invention include recursive geometric registration with sub-pixel matching accuracy that can handle various geometrical residual errors from un-calibrated camera. Additionally, the techniques detailed herein include motion detection based on forward/backward frame differencing that can efficiently separate moving objects from background. Further, a hybrid object tracker can be implemented that uses colors, features and intensity statistical characteristics overtime to detect and track multiple small objects.

Figure 9:
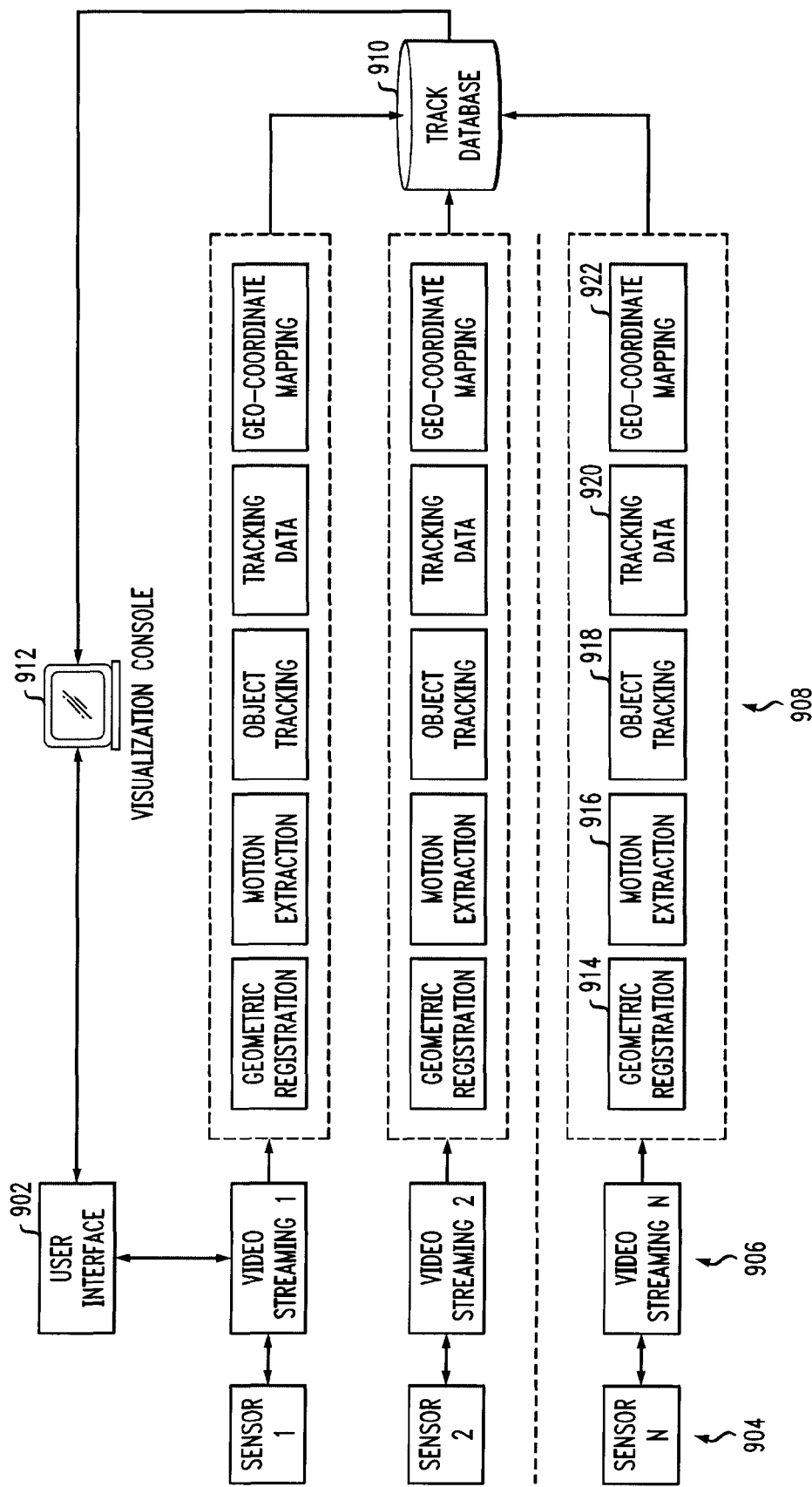
FIG. 9 is a block diagram illustrating architecture of an object detection and tracking system, according to an aspect of the invention.

FIG. 9 is a block diagram illustrating architecture of an object detection and tracking system, according to an aspect of the invention. An example software architecture construction for a detection and tracking system (for example, a UAV system) can be built on multiple services to provide a track database for object search and intelligent analysis. As illustrated in FIG. 9, the software architecture can include multiple sensor modules 904, video streaming service modules 906, tracking suite service modules 908, a track database (DB) server module 910, a user interface module 902 and a visualization console 912. A video streaming module 906 serves to capture and make available imagery from multiple sensors. The acquired images are used by a tracking suite module 908 as the basis for multi-object detection and tracking. Tracking suite modules 908 includes a geometric registration sub-module 914, a motion extraction sub-module 916, an object tracking sub-module 918, a tracking data sub-module 920 and a geo-coordinate mapping sub-module 922.

By processing the real-time imagery from multiple sensors, sophisticated transformation of data to track information is achieved. Track DB server 910 serves track metadata management. Visualization console 912 creates graphical overlays, indexes them to the imagery on the display, and presents them to a user. These overlays can be any type of graphical information that supports the higher level components, such as, for example, class types, moving directions, trajectories and object sizes. User interface 902 provides data access and operation by the user.

Figure 10:
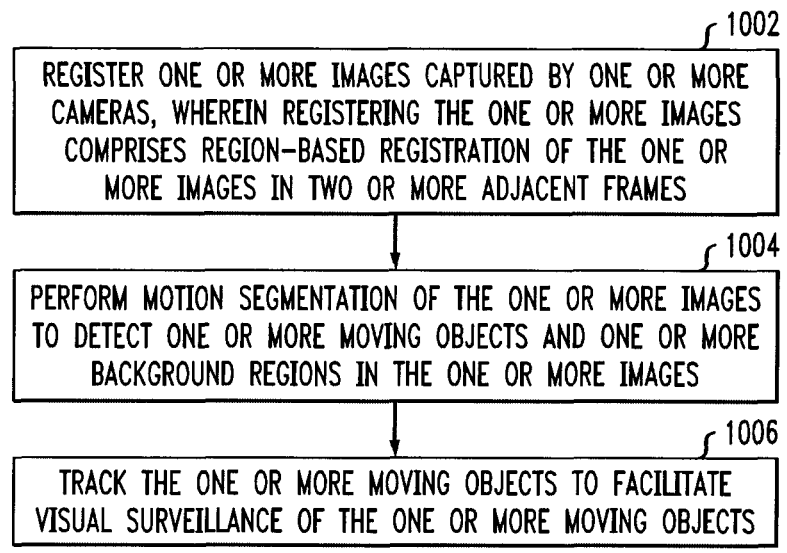
FIG. 10 is a flow diagram illustrating techniques for performing visual surveillance of one or more moving objects, according to an embodiment of the invention.

FIG. 10 is a flow diagram illustrating techniques for performing visual surveillance of one or more moving objects, according to an embodiment of the present invention. Step 1002 includes registering one or more images captured by one or more cameras, wherein registering the one or more images comprises region-based registration of the one or more images in two or more adjacent frames. This step can be carried out, for example, using a geometric registration sub-module 914 in tracking suite service module 908. Registering images can include recursive global and local geometric registration of the one or more images (for example, region-based geometric transformation for handling lens geometric distortion). Registering images can also include using sub-pixel image matching techniques.

Step 1004 includes performing motion segmentation of the one or more images to detect one or more moving objects and one or more background regions in the one or more images. This step can be carried out, for example, using a motion extraction sub-module 916 in tracking suite service module 908. Performing motion segmentation of the images can include forward and backward frame differencing. Forward and backward frame differences can include, for example, automatic dynamic threshold estimation based on temporary filtering and/or spatial filtering, removing false moving pixels based on independent motions of image features, and performing a morphological operation and generating motion pixels.

Step 1006 includes tracking the one or more moving objects to facilitate visual surveillance of the one or more moving objects. This step can be carried out, for example, using an object tracking sub-module 918 in tracking suite service module 908. Tracking the moving objects can include performing hybrid target tracking, wherein hybrid target tracking includes using a Kanade-Lucas-Tomasi feature tracker and meanshift, using auto kernel scale estimation and updating, and using feature trajectories. One or more embodiments of the invention can also include using colors for tracking. Tracking moving objects can additionally include using multi-target tracking algorithms based on feature matching and distance matrices for one or more (small) targets.

Also, tracking moving objects can include generating a motion map, identifying one or more moving objects (blobs), performing object initialization and object checking, identifying object regions in the motion map, extracting features, setting a search region in the motion map, identifying candidate regions in the motion map, meanshift tracking, identifying moving objects in the candidate regions, performing Kanade-Lucas-Tomasi feature matching, performing an affine transform (with RANSAC), making a final regions determination via the Bhattacharyya coefficient, and updating a target model and trajectory information. Tracking moving objects can additionally include reference plane-based registration and tracking.

The techniques depicted in FIG. 10 can also include relating each camera view with one or more other camera views, and forming a panoramic view from the images captured by one or more cameras. One or more embodiments of the invention additionally include estimating motion of each camera based on video information of static objects in the panoramic view, as well as estimating one or more background (for example, road) structures in the panoramic view based on linear structure detection and statistical analysis of the moving objects over a period of time.

Further, the techniques depicted in FIG. 10 include automatic feature (for example, a road) extraction, wherein automatic feature extraction includes framing an image, performing a Gaussian smoothing operation, using a canny detector to extract one or more feature (for example, road) edges, implementing a hough transformation for feature (for example, road stripe) analysis, determining a maximum response finding for reducing an influence of multiple peaks in a transform space, determining if a length of a feature (for example, a road stripe) is greater than a certain threshold, and if the length of the feature is greater than the threshold, performing feature extraction and pixel removal. Automatic feature extraction can additionally include performing frame differencing and verification via motion history images.

One or more embodiments of the invention also include performing outlier removal to remove incorrect moving object matches (and improve the registration precision). The techniques depicted in FIG. 10 can additionally include false blob filtering. False blob filtering includes generating a motion map, applying a connected component process to link each blob data, creating a motion blob table, extracting features for each blob in a previously registered frame, and applying a Kanade-Lucas-Tomasi method to estimate motion of each blob, and, if no motion occurs for a blob, deleting the blob from the blob table.

Additionally, one or more embodiments of the invention can include updating a target model on a temporal domain and/or a spatial domain, as well as creating an index (for example, a searchable index) of object appearances and object tracks in a panoramic view. Also, the object appearance and tracks template index can be stored in a template data store with a pointer to the corresponding video segments for easy retrieval. Further, one or more embodiments of the invention can include determining a similarity metric between a query and an entry in the index, which can facilitate searching for the object appearance and tracks in a template data store/index based on the similarity metric, and outputting/listing the search results for a human operator based on similarity of the query.

The techniques depicted in FIG. 10 can also, as described herein, include providing a system, wherein the system includes distinct software modules, each of the distinct software modules being embodied on a tangible computer-readable recordable storage medium. All the modules (or any subset thereof) can be on the same medium, or each can be on a different medium, for example. The modules can include any or all of the components shown in the figures. In one or more embodiments, the modules include sensor modules, video streaming service modules, tracking suite service modules (including the sub-modules detailed herein), a track database (DB) server module, a user interface module and a visualization console module that can run, for example on one or more hardware processors. The method steps can then be carried out using the distinct software modules of the system, as described above, executing on the one or more hardware processors. Further, a computer program product can include a tangible computer-readable recordable storage medium with code adapted to be executed to carry out one or more method steps described herein, including the provision of the system with the distinct software modules.

Additionally, the techniques depicted in FIG. 10 can be implemented via a computer program product that can include computer useable program code that is stored in a computer readable storage medium in a data processing system, and wherein the computer useable program code was downloaded over a network from a remote data processing system. Also, in one or more embodiments of the invention, the computer program product can include computer useable program code that is stored in a computer readable storage medium in a server data processing system, and wherein the computer useable program code are downloaded over a network to a remote data processing system for use in a computer readable storage medium with the remote system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

One or more embodiments of the invention, or elements thereof, can be implemented in the form of an apparatus including a memory and at least one processor that is coupled to the memory and operative to perform exemplary method steps.

Figure 11:
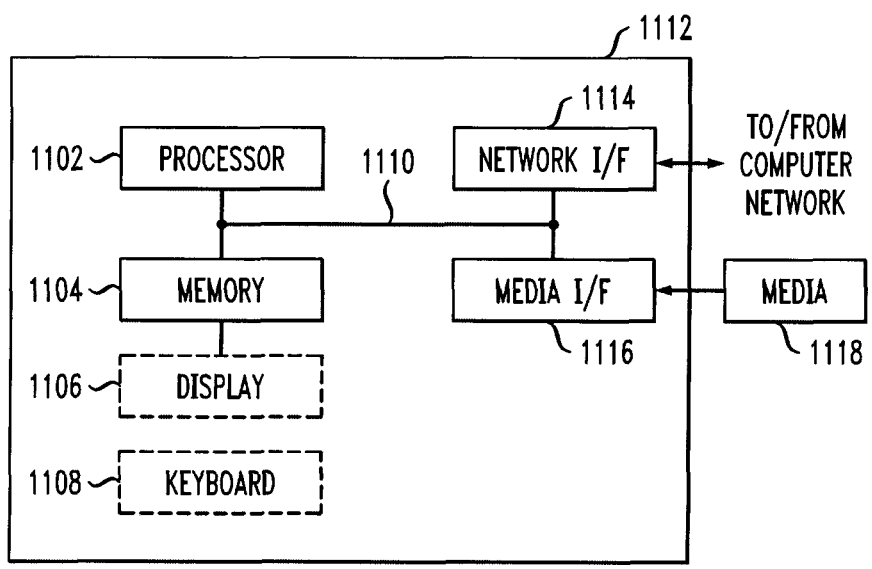
FIG. 11 is a system diagram of an exemplary computer system on which at least one embodiment of the invention can be implemented.

One or more embodiments can make use of software running on a general purpose computer or workstation. With reference to FIG. 11, such an implementation might employ, for example, a processor 1102, a memory 1104, and an input/output interface formed, for example, by a display 1106 and a keyboard 1108. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 1102, memory 1104, and input/output interface such as display 1106 and keyboard 1108 can be interconnected, for example, via bus 1110 as part of a data processing unit 1112. Suitable interconnections, for example via bus 1110, can also be provided to a network interface 1114, such as a network card, which can be provided to interface with a computer network, and to a media interface 1116, such as a diskette or CD-ROM drive, which can be provided to interface with media 1118.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 1102 coupled directly or indirectly to memory elements 1104 through a system bus 1110. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 1108, displays 1106, pointing devices, and the like) can be coupled to the system either directly (such as via bus 1110) or through intervening I/O controllers (omitted for clarity).

Network adapters such as network interface 1114 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 1112 as shown in FIG. 11) running a server program. It will be understood that such a physical server may or may not include a display and keyboard.

As noted, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Media block 1118 is a non-limiting example. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radio frequency (RF), etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, component, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the components shown in FIG. 9. The method steps can then be carried out using the distinct software modules and/or sub-modules of the system, as described above, executing on one or more hardware processors 1102. Further, a computer program product can include a computer-readable storage medium with code adapted to be implemented to carry out one or more method steps described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

At least one embodiment of the invention may provide one or more beneficial effects, such as, for example, automatic dynamic threshold determination based on temporary and/or spatial domain.

It will be appreciated and should be understood that the exemplary embodiments of the invention described above can be implemented in a number of different fashions. Given the teachings of the invention provided herein, one of ordinary skill in the related art will be able to contemplate other implementations of the invention. Indeed, although illustrative embodiments of the present invention have been described herein with reference to the accompanying drawings, it is to be understood that the invention is not limited to those precise embodiments, and that various other changes and modifications may be made by one skilled in the art.

What is claimed is:

1. A computer program product comprising a tangible computer readable recordable storage medium including computer useable program code for performing visual surveillance of one or more moving objects, the computer program product including:

computer useable program code for registering one or more images from unmanned aerial vehicle video input captured by multiple cameras, wherein registering the one or more images comprises recursive global and local geometric registration of the one or more images in two or more adjacent frames, wherein said recursive global and local geometric registration comprises:

(i) partitioning each of the two or more adjacent frames into multiple sub-regions comprising one or more sub-regions associated with a candidate image and one or more sub-regions associated with a reference image;

(ii) determining a corner for each of the one or more sub-regions associated with a candidate image and the one or more sub-regions associated with a reference image via implementing a multi-resolution technique;

(iii) building correspondence of each of the one or more sub-regions associated with a candidate image and the one or more sub-regions associated with a reference image with sub-pixel accuracy;

(iv) estimating local transformation parameters for each of the multiple sub-regions via recursive outlier removal and a least squares technique;

(v) registering all pixels of each of the one or more sub-regions associated with a candidate image to a reference image; and (vi) implementing forward and backward frame-to-frame registration by repeating (i) through (v) for each of the two or more adjacent frames;

computer useable program code for performing motion segmentation of the one or more images to detect one or more moving objects and one or more background regions in the one or more images, wherein said performing comprises automatically estimating a dynamic motion threshold based on spatial filtering;

computer useable program code for combining a distance matrix with a similarity measure to (i) initialize a moving object from the one or more detected moving objects that satisfies one or more parameters and (ii) disregard an object from the one or more detected moving objects as a false moving object that does not satisfy the one or more parameters; and computer useable program code for tracking the initialized moving object to facilitate visual surveillance of the initialized moving object.

2. The computer program product of claim 1, wherein registering one or more images comprises using one or more sub-pixel image matching techniques.

3. The computer program product of claim 1, wherein performing motion segmentation of the one or more images comprises forward and backward frame differencing.

4. The computer program product of claim 3, wherein forward and backward frame differences comprises removing one or more false moving pixels based on independent motions of one or more image features.

5. The computer program product of claim 3, wherein forward and backward frame differences comprises performing a morphological operation and generating one or more motion pixels.

6. The computer program product of claim 1, wherein tracking the initialized moving object comprises performing hybrid target tracking, wherein hybrid target tracking comprises using a Kanade-Lucas-Tomasi feature tracker and meanshift, using auto kernel scale estimation and updating, using one or more feature trajectories and a random sample consensus (RANSAC) outlier removal procedure.

7. The computer program product of claim 1, tracking the initialized moving object comprises using one or more multitarget tracking algorithms based on feature matching and distance matrices for one or more targets.

8. The computer program product of claim 1, wherein tracking the one or more moving objects comprises:
   generating a motion map;
   identifying one or more moving objects;
   performing object initialization and object checking;
   identifying one or more object regions in the motion map;
   extracting one or more features;
   setting a search region in the motion map;
   identifying one or more candidate regions in the motion map;
   meanshift tracking;
   identifying one or more moving objects in the one or more candidate regions;
   performing Kanade-Lucas-Tomasi feature matching;
   performing a random sample consensus (RANSAC) outlier removal;
   making a final regions determination via the Bhattacharyya coefficient; and
   updating a target model and trajectory information.

9. The computer program product of claim 1, wherein tracking the initialized moving object comprises reference plane-based registration and tracking.

10. The computer program product of claim 1, further comprising relating each camera view with one or more other camera views.

11. The computer program product of claim 1, further comprising forming a panoramic view from the one or more images captured by one or more cameras.

12. The computer program product of claim 11, further comprising estimating motion of each camera based on video information of one or more static objects in the panoramic view.

13. The computer program product of claim 11, further comprising estimating one or more background structures in the panoramic view based on linear structure detection and statistical analysis of the one or more moving objects over a period of time.

14. The computer program product of claim 1, further comprising automatic feature extraction, wherein automatic feature extraction comprises:
   framing an image;
   performing a Gaussian smoothing operation;
   using a canny detector to extract one or more feature edges;
   implementing a hough transformation for feature analysis;
   determining a maximum response finding for reducing an influence of multiple peaks in a transform space;
   determining if a length of a feature is greater than a certain threshold, and if the length of the feature is greater than the threshold, performing feature extraction and pixel removal.

15. The computer program product of claim 14, wherein automatic feature extraction further comprises performing frame differencing and verification via motion history images.

16. A system for performing visual surveillance of one or more moving objects, comprising:
   a memory; and
   at least one processor coupled to the memory and operative to:
      register one or more images from unmanned aerial vehicle video input captured by multiple cameras, wherein registering the one or more images comprises recursive global and local geometric registration of the one or more images in two or more adjacent frames, wherein said recursive global and local geometric registration comprises:
         (i) partitioning each of the two or more adjacent frames into multiple sub-regions comprising one or more sub-regions associated with a candidate image and one or more sub-regions associated with a reference image;
         (ii) determining a corner for each of the one or more sub-regions associated with a candidate image and the one or more sub-regions associated with a reference image via implementing a multi-resolution technique;
         (iii) building correspondence of each of the one or more sub-regions associated with a candidate image and the one or more sub-regions associated with a reference image with sub-pixel accuracy;
         (iv) estimating local transformation parameters for each of the multiple sub-regions via recursive outlier removal and a least squares technique;
         (v) registering all pixels of each of the one or more sub-regions associated with a candidate image to a reference image; and
         (vi) implementing forward and backward frame-to-frame registration by repeating (i) through (v) for each of the two or more adjacent frames;
      perform motion segmentation of the one or more images to detect one or more moving objects and one or more background regions in the one or more images, wherein said performing comprises automatically estimating a dynamic motion threshold based on spatial filtering;
      combine a distance matrix with a similarity measure to (i) initialize a moving object from the one or more detected moving objects that satisfies one or more parameters and (ii) disregard an object from the one or more detected moving objects as a false moving object that does not satisfy the one or more parameters; and
      track the initialized moving object to facilitate visual surveillance of the initialized moving object.

17. A method for performing visual surveillance of one or more moving objects, wherein the method comprises:
   registering one or more images from unmanned aerial vehicle video input captured by multiple cameras, wherein registering the one or more images comprises recursive global and local geometric registration of the one or more images in two or more adjacent frames, wherein said recursive global and local geometric registration comprises:
      (i) partitioning each of the two or more adjacent frames into multiple sub-regions comprising one or more sub-regions associated with a candidate image and one or more sub-regions associated with a reference image;
      (ii) determining a corner for each of the one or more sub-regions associated with a candidate image and the one or more sub-regions associated with a reference image via implementing a multi-resolution technique;
      (iii) building correspondence of each of the one or more sub-regions associated with a candidate image and the one or more sub-regions associated with a reference image with sub-pixel accuracy;
      (iv) estimating local transformation parameters for each of the multiple sub-regions via recursive outlier removal and a least squares technique;

(v) registering all pixels of each of the one or more sub-regions associated with a candidate image to a reference image; and (vi) implementing forward and backward frame-to-frame registration by repeating (i) through (v) for each of the two or more adjacent frames;

performing motion segmentation of the one or more images to detect one or more moving objects and one or more background regions in the one or more images, wherein said performing comprises automatically estimating a dynamic motion threshold based on spatial filtering;

combining a distance matrix with a similarity measure to (i) initialize a moving object from the one or more detected moving objects that satisfies one or more parameters and (ii) disregard an object from the one or more detected moving objects as a false moving object that does not satisfy the one or more parameters; and tracking the initialized moving object to facilitate visual surveillance of the initialized moving object.

18. The method of claim 17, wherein registering one or more images comprises using one or more sub-pixel image matching techniques.

* * * * *